(No Model.)

A. C. GOE.
PERCH FOR CAGES.

No. 447,769. Patented Mar. 10, 1891.

Witnesses
Isaac Pehreud
H. F. Riley

Inventor
Alice C. Goe,
By her Attorneys,
C. A. Snow & Co.

UNITED STATES PATENT OFFICE.

ALICE C. GOE, OF STONE FORT, ILLINOIS.

PERCH FOR CAGES.

SPECIFICATION forming part of Letters Patent No. 447,769, dated March 10, 1891.

Application filed September 6, 1890. Serial No. 364,185. (No model.)

*To all whom it may concern:*

Be it known that I, ALICE C. GOE, a citizen of the United States, residing at Stone Fort, in the county of Saline and State of Illinois, have invented a new and useful Perch for Cages, of which the following is a specification.

The invention relates to an improvement in perches for bird-cages.

The object of the present invention is to provide a simple and inexpensive perch for bird-cages adapted to be readily adjusted to suit cages of different sizes and capable of being readily removed and replaced.

The invention consists in the construction and novel combination and arrangement of parts hereinafter fully described, illustrated in the accompanying drawings, and pointed out in the claim hereto appended.

Figure 1:
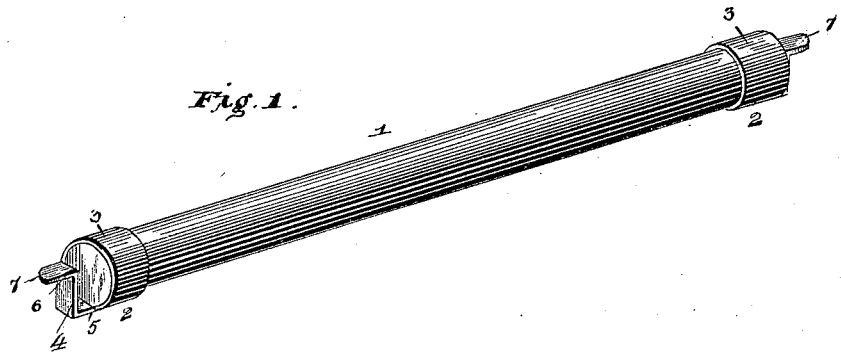
Figure 2:
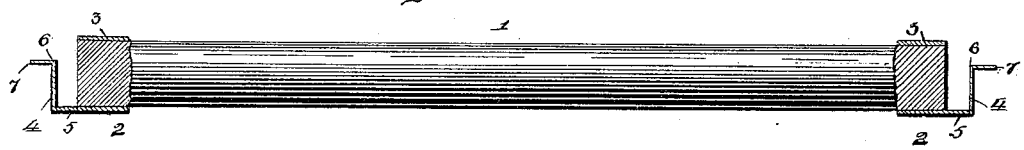
Figure 3:
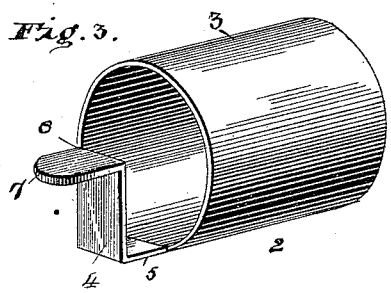

In the drawings, Figure 1 is a perspective view of a bird-cage perch constructed in accordance with this invention. Fig. 2 is a longitudinal sectional view. Fig. 3 is a detail perspective view of one of the clips.

Referring to the accompanying drawings, 1 designates a rod constructed of wood, similar to the ordinary bird-cage perch, and provided at each end with a clip 2, adapted to engage the wires of a bird-cage and secure the ends of the rod to the sides thereof to form a perch. The clip 2 consists of a metal ferrule 3, which forms a socket adapted for the reception of the end of the rod 1 and capable of being moved on the same slightly to permit a small amount of adjustment to enable the perch to be readily fitted to a cage, and the said rod may be cut the proper length and the ferrules can be readily fitted on the end of the rod, thereby making a perch readily adjustable to any-sized bird-cage, either circular or rectangular. The ferrule 3 is provided with an L-shaped hook 4, which engages the wire, and is secured to the outer face of the ferrule and has one portion 5 extending longitudinally of the rod and projecting beyond the same at its upper portion 6, extending across the end of the rod a short distance therefrom, and the end of the hook 4 is bent at right angles to the portion 6 to form a lip 7, which can be readily grasped by the fingers to enable the perch to be readily secured to a bird-cage and removed therefrom.

It will be seen that the clip is exceedingly simple and inexpensive in construction, and is adapted to be readily secured to an end of a perch-rod, and thereby provide an adjustable perch adapted to be readily fitted to any construction of bird-cage without liability of bending or injuring the wires thereof.

What I claim is—

A clip for bird-cage perches, comprising the ferrule forming the socket adapted to receive an end of the perch-rod, and the L-shaped hook having one arm 5 extending from the socket and projecting beyond the rod, and the arm 6 extending across the end of the rod a short distance therefrom and provided with the lip 7, projecting from the hook and forming a finger-hold, substantially as described.

In testimony that I claim the foregoing as my own I have hereto affixed my signature in presence of two witnesses.

ALICE C. GOE.

Witnesses:
H. S. GOE,
M. B. GOE.